United States Patent [19]

Shanok et al.

[11] Patent Number: 5,385,703
[45] Date of Patent: Jan. 31, 1995

[54] FORMING EXTRUDED MOLDING TRIM FOR VEHICLES AND APPLIANCES

[75] Inventors: William Shanok, New York, N.Y.; Daniel Shanok; Frederick Shanok, both of Warren, N.J.; Ronald Good, Bloomfield Hills, Mich.; Joseph Limansky, East Brunswick, N.J.; Victor Shanok; Jesse P. Shanok, both of New York, N.Y.

[73] Assignee: Silvatrim Associates, South Plainfield, N.J.

[21] Appl. No.: 138,200

[22] Filed: Oct. 20, 1993

Related U.S. Application Data

[62] Division of Ser. No. 980,226, Nov. 23, 1992.

[51] Int. Cl.$^6$ .............................................. B29C 47/02
[52] U.S. Cl. ...................... 264/145; 264/149; 264/171; 264/167; 264/177.19; 264/177.2; 425/113; 425/142
[58] Field of Search ... 264/167, 177.10, 177.16–177.19, 264/177.2, 149, 151, 145, 171; 425/466, 465, 327, 113, 142

[56] References Cited

U.S. PATENT DOCUMENTS

| | | | |
|---|---|---|---|
| 3,330,187 | 7/1967 | Kohler et al. | 264/177.17 |
| 3,496,262 | 2/1970 | Long et al. | 264/177.16 |
| 3,655,855 | 4/1972 | Brumlik | 264/167 |
| 3,830,610 | 8/1974 | Ohkawa et al. | 425/466 |
| 3,854,859 | 12/1974 | Sola | 425/466 |
| 3,932,090 | 1/1976 | Brumlik | 425/466 |
| 4,056,593 | 11/1977 | Albareda | 264/167 |
| 4,861,530 | 8/1989 | Zaccaria | 264/149 |
| 5,171,499 | 12/1992 | Cehelnik et al. | 264/151 |

FOREIGN PATENT DOCUMENTS

| | | | |
|---|---|---|---|
| 63-77720 | 4/1988 | Japan | 264/177.1 |
| 2-95948 | 4/1990 | Japan | 264/177.1 |

*Primary Examiner*—Jeffery R. Thurlow
*Attorney, Agent, or Firm*—Goodman & Teitelbaum

[57] ABSTRACT

An extruded molding trim for vehicles, appliances and the like, which has a one piece integral construction including a longitudinally extending strip-like upper portion and longitudinally spaced apart leg portions extending perpendicularly downwardly therefrom either in a single or a double row, the portions having outwardly extending tabs disposed on opposite sides or on only one side thereof for attachment to a part of a vehicle, appliance and the like, the molding trim being formed from an extruded plastic strip. The upper portion and the leg portions are fabricated from either a rigid or a resilient flexible plastic material, with the tabs being fabricated from either a rigid or a resilient deformable or flexible plastic material. The tabs are pointed or elongated fingers, directed upwardly towards the upper portion, or each of the tabs can include adjacent outwardly and inwardly inclined outer surfaces to provide a point extending transversely outwardly from each leg portion, where each leg portion may include numerous tabs, aligned pairs of associated tabs, or staggered tabs. The upper portion can encapsulate a metallic strip therein, can be provided with longitudinally extending parallel grooves in an upper surface thereof, or can be provided with at least one downwardly extending longitudinal side flange preferably having a metallic strip disposed around the side flange, and a protective transparent plastic strip disposed over the metallic strip.

12 Claims, 7 Drawing Sheets

FORMING EXTRUDED MOLDING TRIM FOR VEHICLES AND APPLIANCES

This application is a division of application Ser. No. 07/908,226, filed Nov. 23, 1992, status pending.

BACKGROUND OF THE INVENTION

The invention relates to molding trim, and more particularly, to an extruded molding trim for vehicles, appliances and the like, which has a one piece integral construction including a longitudinally extending upper strip-like portion and spaced apart leg portions 14 extending perpendicularly downwardly therefrom, the leg portions having outwardly extending tabs, for attachment to an underside of a part of a vehicle, appliance and the like, when the leg portions are inserted through slots in the part to secure the extruded molding trim to the part.

Molding trims, including extruded molding trims, are well known in the art, where usually separate fastening means are used to secure a molding trim to a part of the vehicle, and the like. U.S. Pat. No. 4,103,400 discloses a metal dart clip for securing a rubber or plastic impact strip on a vehicle bumper, where U.S. Pat. No. 4,363,839 discloses an engaging member, similar to the above dart clip, secured to a rocker, side or hood trim strip for engaging the trim strip to the surface of an automobile. Additionally, U.S. Pat. No. 5,038,444 discloses a molding support assembly for mounting a molding strip on an automobile body including an intermediate piece connected to the molding strip and support pegs secured to the intermediate piece whereby the support pegs are attached to the base wall of the automobile body by snapping into attachable linings mounted in the base wall to secure the molding strip to the automobile body.

U.S. Pat. No. 4,139,664 discloses an elongated extruded strip adapted to be mechanically secured to a slotted sheet-like substrate, the strip being provided with longitudinally spaced apart teeth which are forced through the slots of the substrate. Heat is then applied to the portions of the teeth which project through the slots to form a head or bead on the ends of the teeth and thereby mechanically secure the strip to the substrate. The strip includes a resilient adhesive tape on the inner wall thereof to allow the strip to deform when pressed against the substrate to force the teeth to project further through the slots to ensure a tight securement. The teeth may have an arrowhead at the free end thereof when the substrate is of uniform thickness, where the arrowhead is forced through the slot.

U.S. Pat. No. 4,270,328 discloses fastener means for an interior trim panel including a pushed-in stud which is secured to a panel to secure the panel to a retainer. The stud includes a shank provided with a tapered free end and bar-like projections so that one set of the projections engages the lower surface of the retainer 50. The projections are annular rings which are made to extend only from opposite sides of the shank to provide flat shank portions therebetween to facilitate turning of the shank to effect assembly of the stud head to the panel. The stud displaces the retainer in a longitudinal direction to effect axial alignment between the stud shank and the hole in the retainer.

Accordingly, there is presently a need for an extruded molding trim that can be easily and inexpensively manufactured, and which provides a simple and quick method for attaching the extruded molding trim to a part of a vehicle, appliance and the like, in which the attachment means thereof are an integral part of the extruded molding trim, in that the extruded molding trim and the attachment means are formed in a one piece construction.

SUMMARY OF THE INVENTION

It is accordingly an object of the present invention to provide an extruded molding trim for vehicles, appliances and the like which avoids the problems and disadvantages of the prior art devices.

Another object of the present invention is to provide an extruded molding trim for vehicles, appliances and the like, which has a one piece integral construction including a longitudinally extending upper strip-like portion and longitudinally spaced apart leg portions extending perpendicularly downwardly therefrom, the leg portions having outwardly extending tabs for attachment to an underside of a part of a vehicle, appliance and the like.

A further object of the present invention is to provide an extruded molding trim, as described above, which can be formed from an extruded plastic strip.

Still another object of the present invention is to provide an extruded molding trim, as described above, in which the upper strip-like portion and the leg portions are fabricated from a rigid plastic material, and the tabs are fabricated from either a rigid plastic material or from a resilient deformable plastic material.

Another object of the present invention is to provide an extruded molding trim, as described above, in which the tabs are pointed and directed upwardly towards an underneath surface of the upper strip-like portion, where each leg portion may include numerous tabs, aligned tabs, or staggered tabs on one side or on opposite sides of each of the leg portions arranged in a single or double row.

Yet another object of the present invention is to provide an extruded molding trim, as described above, wherein the tabs are finger-like and elongated in an upward direction toward the underneath surface of the upper strip-like portion.

Yet another object of the present invention is to provide an extruded molding trim, as described above, wherein each of the tabs includes an outwardly inclined outer surface adjacent to an inwardly inclined outer surface to provide a point outwardly extending from each of the opposite sides of each of the leg portions.

A further object of the present invention is to provide an extruded molding trim, as described above, wherein the upper strip-like portion encapsultes a metallic strip therein.

Another object of the present invention is to provide an extruded molding trim, as described above, wherein the upper strip-like portion has longitudinally extending grooves in an upper surface thereof.

Yet another object of the present invention is to provide an extruded molding trim, as described above, wherein the upper strip-like portion is provided with at least one longitudinally downwardly extending side flange, with a metallic strip being disposed around the side flange, and a protective transparent plastic strip being disposed over the metallic strip.

And still yet another object of the present invention is to provide an extruded molding trim, as described above, which can be easily and inexpensively manufactured, and which permits the user thereof to simply and quickly install the extruded molding trim on a part of a vehicle, appliance and the like, and which also permits the removal thereof.

Briefly, in accordance with the present invention, there is provided an extruded molding trim for vehicles, appliances and the like, which has a one piece integral construction including a longitudinally extending upper strip-like portion and longitudinally spaced apart leg portions extending perpendicularly downwardly therefrom either in a single or double row, the leg portions having outwardly extending tabs on one side or on opposite sides thereof for attachment to an underside of a part of a vehicle, appliance and the like, the extruded molding trim being formed from an extruded plastic strip. The upper strip-like portion and the leg portions are fabricated from a rigid plastic material, with the tabs being fabricated from either a rigid plastic material or from a resilient deformable plastic material.

In one embodiment, the tabs are pointed and directed upwardly towards the underneath surface of the upper strip-like portion, in another embodiment, the tabs are finger-like and elongated in an upward direction towards the underneath surface of the upper strip-like portion, and in yet another embodiment, each of the tabs includes an outwardly inclined outer surface adjacent to an inwardly inclined outer surface to provide a point outwardly extending from each of the opposite sides of each of the leg portions, where each leg portion may include numerous tabs, aligned pairs of associated tabs, or staggered tabs on opposite sides or on only one side of each of the leg portions. The upper strip-like portion can encapsulate a metallic strip therein, or can be provided with longitudinally extending grooves in an upper surface thereof, or can be provided with at least one longitudinally, downwardly extending side flange preferably having a metallic strip disposed around the side flange, and a protective transparent plastic strip disposed over the metallic strip.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which.

In the various figures of the drawings, like reference characters designate like parts.

DESCRIPTION OF THE PREFERRED EMBODIMENTS

Figure 1:
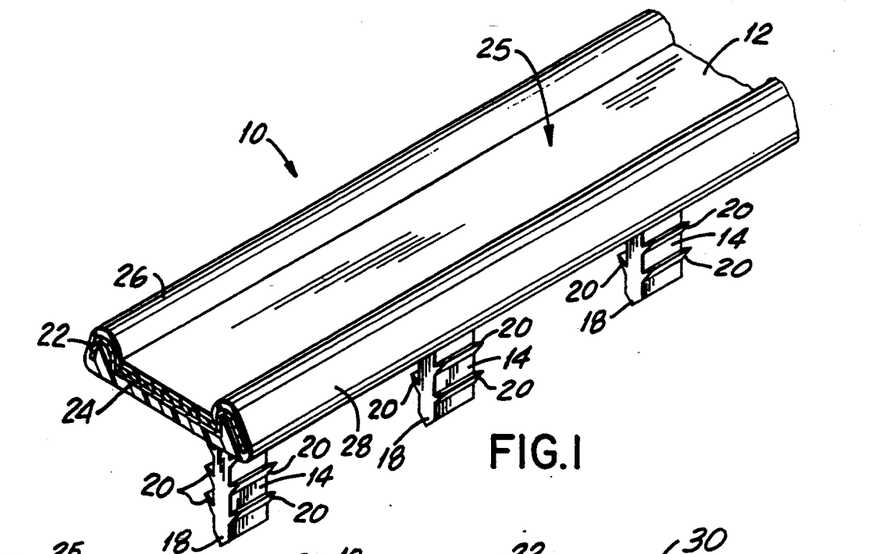
FIG. 1 is a fragmented perspective view of an extruded molding trim for vehicles, appliances, and the like, according to the present invention.
Figure 2:
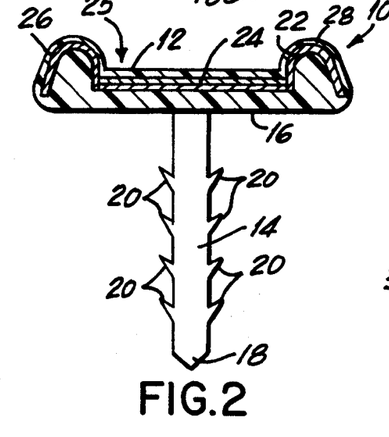
FIG. 2 is an end view, in cross section, of the extruded molding trim of FIG. 1.

Referring now to the drawings, FIG. 1 shows an extruded molding trim 10 constructed according to the present invention. The extruded molding trim 10 has a one piece integral body member including a longitudinally extending upper strip-like portion 12 and longitudinally spaced apart leg portions 14 extending perpendicularly and vertically downwardly from the underneath surface 16 of the upper strip-like portion 12, as best shown in FIG. 2. As clearly shown in FIGS. 1 and 2, the upper strip-like portion 12 has a uniform cross section throughout its length. The leg portions 14 are centrally located along the undersurface 16. Each leg portion 14 having a pointed free end 18, and numerous aligned pairs of pointed projecting tabs 20 extending transversely outwardly in an upward direction from opposite longitudinal sides of each leg portion 14. Preferably, there are four pairs of tabs 20 on each leg 14, which are spaced a predetermined distance from both the end 18 of the leg portion 14 and from the undersurface 16 of the upper strip-like portion 12, as will be explained below.

The upper strip-like portion 12 is preferably transparent and encapsulates a metallic strip 22 therein, such being well known in the art as discussed in U.S. Pat. No. 3,730,577 to which reference may be made. The metallic strip 22 extends for the entire longitudinal length of the upper strip-like portion 12 so that the upper strip-like portion 12 takes on the appearance of the metallic strip 22. For example, if the metallic strip 22 is chrome or has a silver metal-like finish, then the upper strip-like portion 12 would have a metal appearance, such as found on automobiles and appliances. Additionally, a plastic ribbon like strip 24 is disposed on the central portion of the metallic strip 22 along the entire longitudinal length thereof, and is also encapsulated within the upper strip-like portion 12, preferably within a recess 25 formed therein. The ribbon-like strip 24 has a wood grain finish so that the center recessed part of the upper strip-like portion 12 has an appearance of wood.

Accordingly, the metallic strip 22 can be made in any color or texture as desired to provide the upper strip-like portion 12 with a particular decorative appearance. The metallic strip 22 can be fabricated from a metalized mylar or any other suitable material such as a chrome film, tin foil and the like which is fed in during the extrusion process, as mentioned below. If desired, the metallic strip 22 can be fabricated from a stiff rigid material to strengthen the upper strip-like portion 12. Preferably, the longitudinal outer edges 26, 28 of the upper strip-like portion 12 are enlarged and rounded to provide the recess 25 and a decorative appearance of metal rods being disposed on opposite sides of a wood strip which is created by the ribbon-like strip 24.

Figure 3:
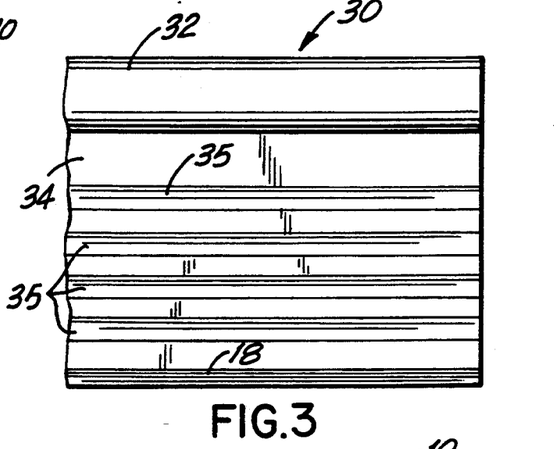
FIG. 3 is a fragmented side elevational view of an extruded plastic strip used in the construction of the extruded molding trim of FIG. 1.

The extruded molding trim 10 is constructed from a continuous extruded T-shaped strip 30 of thermoplastic material, such as acrylonitrile butadiene styrene commonly referred to as ABS, as shown in FIG. 3. The extruded T-shaped plastic strip 30 includes a first bar-like portion 32 which forms the upper strip-like portion 12, and a transverse perpendicular second bar-like portion 34 which is used to form the leg portions 14. Accordingly, the first bar-portion 32 is constructed in the same manner as mentioned above for the upper strip-like portion 12, with the metallic strip 22 and the ribbon-like strip 24 encapsulated therein during the extrusion thereof.

The transverse second bar-like portion 34 is constructed as a continuous longitudinal piece having the pairs of pointed projecting tabs 20 formed as rib-like constructions 35 extending outwardly in an upward direction from opposite sides thereof along the entire longitudinal length of the transverse second bar-like portion 34, as shown in FIG. 3, with the free end 18 thereof being pointed along its entire longitudinal length. It is noted, that the extruded T-shaped strip 30 can be extruded from one material, such as ABS mentioned above, or can be formed by a twin extrusion where a second additional material can be used to form the pointed projecting ribs 35 to provide the tabs 20, such as a soft vinyl material of low durometer, such as urethane, so that the pointed projecting tabs 20 would be resilient and could easily be deformed in the function thereof, as mentioned below. It is further noted, in view of the showing in FIG. 3 and the indication of FIGS. 1 and 2, that the extruded T-shaped strip 30 has a uniform cross section throughout its length.

Figure 4:
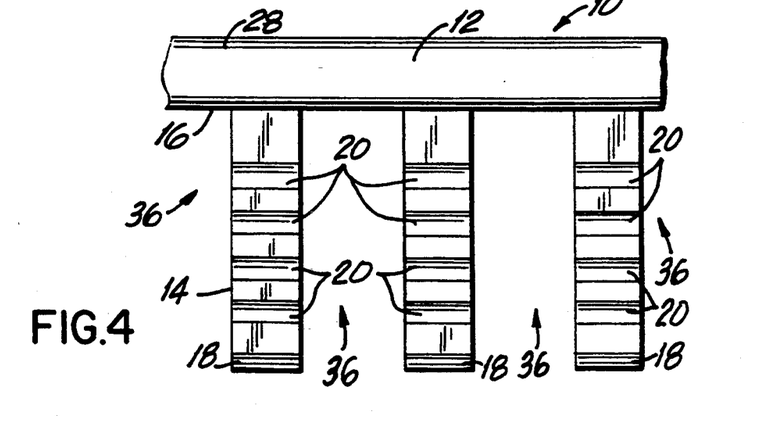
FIG. 4 is a fragmented side elevational view of the extruded molding trim of FIG. 1 formed from the extruded plastic strip of FIG. 3.

After the T-shaped strip 30 is extruded, the T-shaped strip 30 passes through a notching station where the second bar-like portion 34 is notched at longitudinally spaced apart intervals across its entire transverse length, including through the pairs of ribs 35 thereon, from the underneath surface 16 of the first bar-like portion 32 to the end 18 thereof, where the intervals are predetermined along the longitudinal length thereof. Accordingly, as shown in FIG. 4, the first bar-like portion 32 is not cut so that he first bar-like portion 32, which forms the upper strip-like portion 12, is maintained with a uniform cross section throughout its length. The notched portions are removed to provide cutouts 36 in the second bar-like portion 34 to form the legs 14, as shown in FIG. 4.

Figure 5:
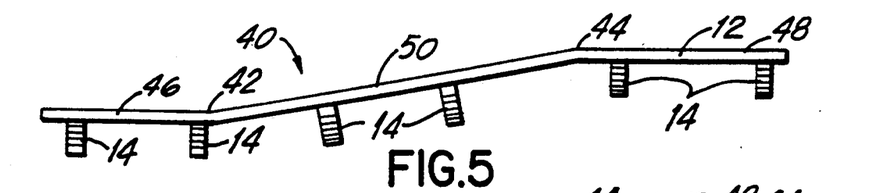
FIG. 5 is a side elevational view of the extruded molding trim bent in a particular manner for attachment thereof.

FIG. 5 shows an example of extruded molding trim 40 constructed in the same manner as mentioned above to provide the upper strip-like portion 12 and spaced apart leg portions 14. The extruded molding trim 40 is cut to a particular length, and is bent at points 42, 44 so that the two opposite end portions 46, 48 are disposed parallel to each other and the intermediate portion 50 is inclined. Accordingly, the extruded molding trim 40 has a particular configuration for attachment to a particular molding or part, as explained below.

Figure 6:
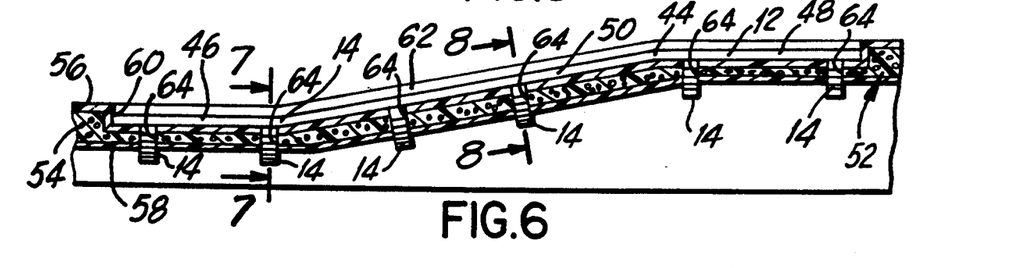
FIG. 6 is a fragmented side elevational view, in cross section, showing the extruded molding trim of FIG. 5 attached to a molding.

FIG. 6 shows an automobile interior door part or panel 52 fabricated from a plastic foam-like material 54 having a plastic outer cover 56 and a plastic inner cover 58 thereon, where the door panel 52 to some degree is deformable, as indicated below. A recess 60 is formed therein to receive the extruded molding trim 40, an intermediate portion 62 of the door panel 52 is inclined in the same manner as the intermediate portion 50 of the extruded molding trim 40 to provide a particular design thereto. Numerous slots 64 are provided through the base of the recess 60 to receive the leg portions 14 of the extruded molding trim 40, there being as many slots 64 as there are leg portions 14. The slots 64 are approximately the same size as the thickness of the leg portions 14, the slots 64 being only slightly larger to provide the proper clearance for the leg portions 14. However, the distance between the tips of each pair of tabs 20 is larger than the width of the slots 64, as explained below.

Accordingly, in the assembly, the leg portions 14 of the extruded molding trim 40 are placed into the recess 60 so that end 18 of each of the leg portions 14 is aligned with its associated slot 64. The extruded molding trim 40 is then pushed into the recess 60, forcing the leg portions 14 through the slots 64, where the pointed free ends 18 of the legs 14 are used as a pilot to guide the leg portions 14 into and through the door panel 52.

Figure 7:
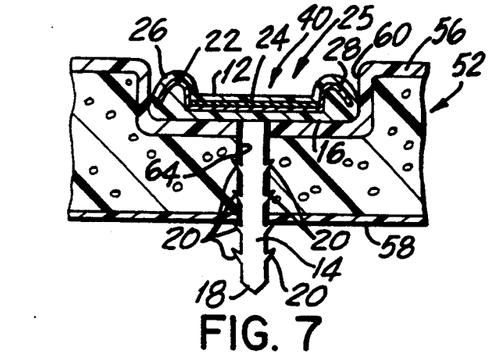
FIG. 7 is a cross sectional view taken along line 7—7 of FIG. 6.
Figure 8:
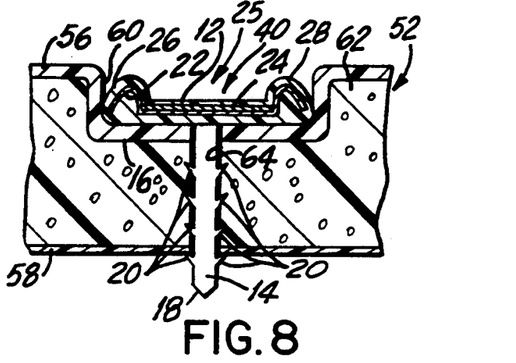
FIG. 8 is a cross sectional view taken along line 8—8 of FIG. 6.

Once the extruded molding trim 40 is properly seated within the recess 60, one pair of tabs 20 will catch or hook behind the inner cover 58, as best shown in FIGS. 7 and 8. It is noted, that the door panel 52 does not have a uniform thickness because the foam-like material 54 can vary in thickness during the manufacture thereof. Thus, as shown in FIG. 7, the second pair of tabs 20 from the end 18 catch behind the inner cover 58, while as shown in FIG. 8, the first pair of tabs 20 from the end 18 catch behind the inner cover 58. Thus, the extruded molding trim 40 is easily attached to the door panel 52 where the numerous pairs of tabs 20 on each of the leg portions 14 compensates for any varying or non-uniform thickness of the door panel 52.

Though one example has been shown above, it is understood that the extruded molding trim of the present invention can be attached to many different types of moldings, panels, parts and the like which are fabricated from many different types of material, while further examples are set forth below. In the above example, the tabs 20 are fabricated from a rigid material for insertion through the smaller sized slots 64, and the material of the door panel 52 is fabricated from a resilient deformable material so that when the tabs 20 are passing through the smaller sized slots 64, the walls of the slots 64 in the door panel 52 deform to allow the tabs 20 to pass therethrough.

However, should the extruded molding trim be trim be attached to a molding, panel or part fabricated from a rigid material, such as rigid plastic or sheet metal, it has been found that such rigid material can shear off some of the tabs 20 when the leg portions 14 are being forced into the slots. Therefore, in such cases, the tabs 20 would be fabricated from a soft vinyl material, such as urethane, as indicated above, so that the tabs 20 would be resilient and deform rather than being sheared off, examples thereof being described below. Thus, if the receiving part or member is fabricated from a resilient deformable material, the tabs 20 can be fabricated from a rigid material. However, should the receiving part or member be fabricated from a rigid material, then the tabs 20 should be fabricated from a resilient deformable material.

Figure 9:
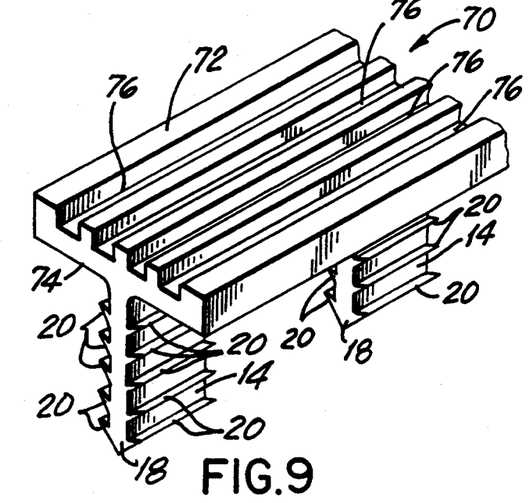
FIG. 9 is a fragmented perspective view of a modified extruded molding trim.
Figure 10:
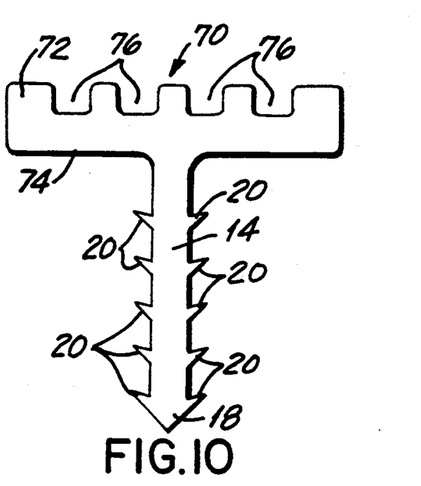
FIG. 10 is an end view of the modified extruded molding trim of FIG. 9.

FIGS. 9 and 10 show a modified extruded molding trim 70 having a longitudinally extending upper strip-like portion 72 and the spaced apart leg portions 14 extending perpendicularly and vertically downwardly from a center portion of the underneath surface 74 of the upper strip-like portion 72, as best shown in FIG. 10. The leg portions 14 are constructed in the same manner as mentioned above, having a pointed free end 18, and pairs of pointed projecting tabs 20 extending outwardly in a slightly upward direction towards the upper strip-like portion 72 from opposite sides of each leg portion 14. In this case, there are five pairs of tabs 20 on each leg portion 14, with one pair of tabs 20 being disposed adjacent to the end 18.

The upper strip-like portion 72 has longitudinally extending grooves 76 in its upper surface. Preferably, there are four grooves 76. It is noted, that the grooves 76 provide a non-skid upper surface on the upper strip-like portion 72. Accordingly, the upper strip-like portion 72 can be opaque and can be made in any desired color or texture, or can be transparent and include the metallic strip 22 and/or ribbon-like plastic strip 24 encapsulated therein to provide a particular decorative appearance as mentioned above.

Figures 11, 12, 13, 14:
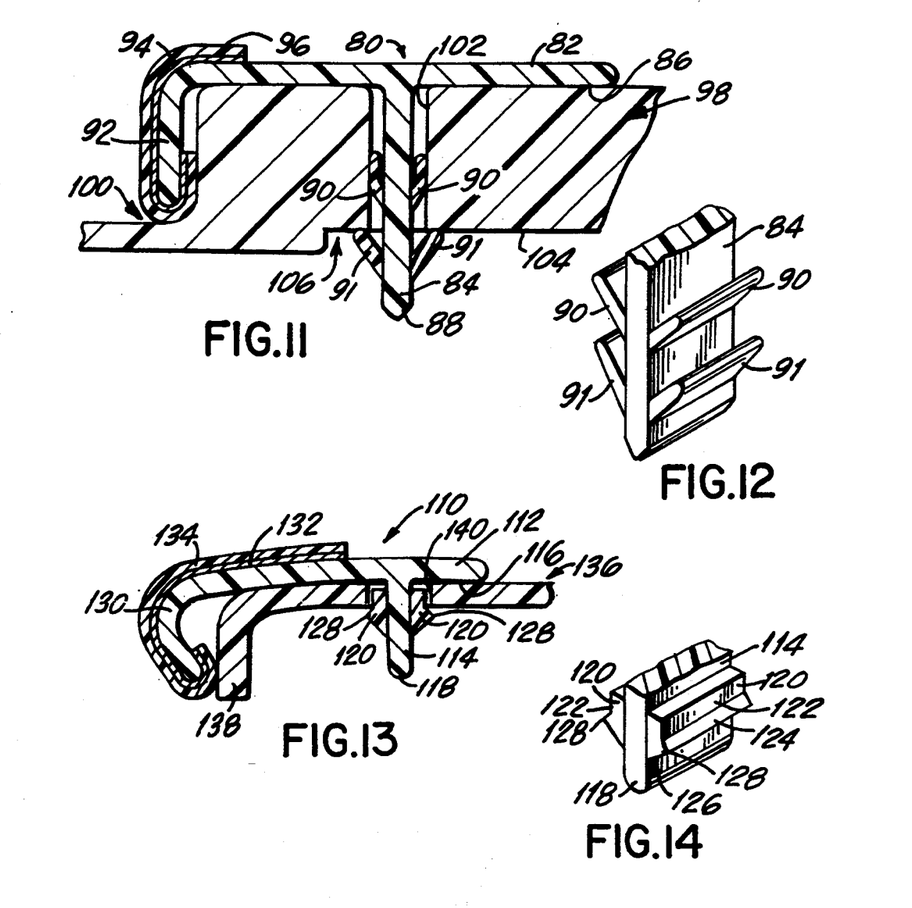
FIG. 11 is a fragmented cross sectional view of a further modified extruded molding trim attached to a molding.
FIG. 12 is a fragmented perspective view of the attachment means of the extruded molding trim of FIG. 11.
FIG. 13 is a fragmented cross sectional view of another modified extruded molding trim attached to a molding.
FIG. 14 is a fragmented perspective view of the attachment means of the extruded molding trim of FIG. 13.

FIG. 11 shows a further modified extruded molding trim 80 having a longitudinally extending upper strip-like portion 82 and longitudinally spaced apart leg portions 84 extending perpendicularly and vertically downwardly from an approximate center portion of the underneath surface 86 of the upper strip-like portion 82. The leg portions 84 are constructed in a similar manner as the above-mentioned leg portions 14, the leg portions 84 having a slightly pointed free end 88, and pairs of elongated finger-like tabs 90, 91 extending outwardly in a upward direction towards the upper strip-like portion 82 from opposite sides of each leg portion 84. In this case, there are two pairs of finger-like tabs 90, 91 on each leg portion 84, the pairs of finger-like tabs 90, 91 being spaced from the end 88 and also from the upper strip-like portion 82.

Preferably, the upper strip-like portion 82 and the leg portions 84 are fabricated from a rigid plastic material, such as the above-mentioned ABS, where the finger-like tabs 90, 91 are fabricated from a resilient deformable plastic material, such as the above-mentioned urethane, in order to function as mentioned below.

One side edge of the upper strip-like portion is bent downwardly to provide a longitudinally extending side flange 92. A longitudinal metallic strip 94 is disposed around the side flange 94, where the metallic strip 94 can be fabricated in the same manner as the above-mentioned metallic strip 22, being metal, a chrome film, tin foil, metalized mylar and the like. Accordingly, a longitudinal protective transparent plastic strip 96 is disposed over the metallic strip 94 to provide a metal appearance as described above. Preferably, the upper strip-like portion 82 is opaque and is made in any desired color or texture. Accordingly, the metallic strip 94 and the protective transparent plastic strip 96 can be extruded together with the upper strip-like portion 82 and leg portions 84, or can be securely mounted onto the side flange 92 after the extrusion thereof.

As shown in FIG. 11, the extruded molding trim 80 is attached to a plastic molding or part 98 of an automobile or appliance, such as a refrigerator, dishwashing machine and the like. The part 98 is preferably fabricated from a rigid plastic material, and includes a longitudinally extending step 100 on one side thereof to snugly receive the side flange 92, and the metallic strip 94 and protective transparent plastic strip 96 thereon, to provide a decorative longitudinal side edge for the part 98. Slots 102 are provided through the upper portion of the part 98, the slots 102 being longitudinally spaced apart by a predetermined distance and also being spaced a predetermined distance from the longitudinally extending step 100 to properly receive associated ones of the leg portions 84 therein.

In the assembly, the side flange 92 is lined up with the step 100 and the pilot ends 88 of the leg portion 84 are aligned up with their associated slots 102, and then the extruded molding strip 80 is pushed towards the part 98 so that the flange 92 fits into the step 100 and the leg portions 84 are inserted into their associated slots 102. Accordingly, as each leg portion 84 is being inserted through its associated slot 102, the pairs of finger-like tabs 90, 91 are deformed and pushed inwardly towards the leg portion 84 by the rigid plastic walls of the respective slot 102, as indicated by the second pair of finger-like tabs 90 from the end 88 in FIG. 11.

Once the pair of finger-like tabs 91 exists the opposite end of the respective slot 102 and is free of the slot walls, the resilient material of the finger-like tabs 91 causes the finger-like tabs 91 to spring back to their normal position, as shown by the first pair of finger-like tabs 91 from the end 88 in FIG. 11. The thickness of the part 98, and therefore the depth of the slots 102, is predetermined so that at least one of the pairs of finger-like tabs 90, 91 will engage the inner surface 104 of a cutaway or stepped portion 106 in the part 98.

Thus, if a moderate force is used in an attempt to remove the extruded molding trim 80 from the part 98, the finger-like tabs 91 of the first pair from the end 88 will engage the inner surface 104 of the part 98, and will bend outwardly away from the leg portion 84 along the inner surface 104 to prevent the removal of the extruded molding trim 80. However, if a sufficiently strong force is used, the finger-like tabs 91 of the first pair from the end 88 will first bend outwardly away from the leg 84, as mentioned above, and then will continue to bend downwardly, by the strong force, towards the leg portion 84 so that the the finger-like tabs 91 of the extruded molding trim 80 can be forced back into the slot 102 and removed from the part 98, such as when it is necessary to replace the extruded molding trim 80.

It is noted, that the second pair of finger-like tabs 90 in their deformed condition within the slot 102 provides additional restraining means to secure the extruded molding trim 80 to the part 98. Furthermore, though only two pairs of finger-like tabs 90, 91 are shown, it is understood that additional pairs of finger-like tabs can be added to the leg portions 84 so that the extruded molding trim 80 can be attached to a variety of parts having different thicknesses, where one extruded molding trim 80 would fit all the parts.

FIG. 13 shows another modified extruded molding trim 110 having a longitudinally extending upper strip-like portion 112 and longitudinally spaced apart leg portions 114 extending perpendicularly and vertically downwardly from the underneath surface 116 of the upper strip-like portion 112 adjacent to the inner end portion thereof. The leg portions 114 are constructed in a similar manner as the above-mentioned leg portions 14, the leg portions 114 having a curved or rounded free end 118, and only one pair of pointed tabs 120 extending outwardly from opposite sides of each leg portion 114. The pointed tabs 120 are disposed at a predetermined intermediate position on the leg portion 114, as set forth below.

As best shown in FIG. 14, each pointed tab 120 includes an upper vertical outer surface 122 horizontally spaced from the leg portion 114, which extends into a downwardly inclined, outwardly extending outer surface 124. The inclined outer surface 124 extends into an adjacent downwardly inclined, inwardly extending outer surface 126, which at the lower end thereof engages the leg portion 114. Thus, the inclined outer surfaces 124, 126 form an outwardly transversely extending point 128, as will be discussed below.

Preferably, the upper strip-like portion 112 and the leg portions 114 are fabricated from a rigid plastic material, such as the above-mentioned ABS, where the pointed tabs 120 are fabricated from a resilient deformable plastic material, such as the above-mentioned urethane, in order to function as mentioned below.

The outer side edge of the upper strip-like portion 112 is curved downwardly to provide a curved longitudinally extending side flange 130. A longitudinal metallic strip 132 is disposed around the side flange 130, being fabricated and functioning in the same manner as the above-mentioned metallic strip 94 shown in FIG. 11. Accordingly, a longitudinal protective transparent plastic strip 134 is disposed over the metallic strip 132 to function in the same manner as the above-mentioned transparent plastic strip 96 of FIG. 11 so that a metal appearance is provided as described above. Here again, the upper strip-like portion 112 is preferably opaque and can be made in any desired color or texture. As indicated above, the metallic strip 132 and the protective transparent strip 134 can be extruded together with the upper strip-like portion 112 and leg portions 114, or can be mounted onto the side flange 130 after the extrusion thereof.

As shown in FIG. 13, the extruded molding trim 110 is attached to a plastic molding or part 136 of an automobile or appliance, such as a refrigerator, dishwashing machine and the like. The part 136 is preferably fabricated from a rigid plastic material, and includes a longitudinally extending side edge 138 on the outer side thereof to receive thereon the side flange 130, and the metal strip 132 and the protective transparent strip 134 thereon, to provide a decorative longitudinal side edge for the part 136. Slots 140 are provided through the upper portion of the part 136, the slots 140 being longitudinally spaced apart by a predetermined distance and also being spaced a predetermined distance from the longitudinally extending side edge 138 to properly receive associated ones of the leg portions 114 therein.

In the assembly, the side flange 130 is lined up with the side edge 138 and the pilot ends 118 of the leg portions 114 are aligned with their associated slots 140, and then the extruded molding trim 110 is pushed towards the part 136 so that the side flange 130 engagingly slides against the side edge 138 as the leg portions 114 are being inserted into their associated slots 140. Accordingly, as each leg portion 114 is being inserted through its associated slot 140, the point 128 of each pointed tab 120 is deformed and pushed inwardly towards the leg portion 114 by the rigid plastic walls of the respective slot 140 bearing against the inclined surfaces 126. It is noted, that preferably the distance from the vertical surface 122 of one tab 120 to the opposing vertical surface 122 of the other tab 120 is less than the width of the slot 140 to provide a clearance fit therebetween. Furthermore, the lower inwardly extending inclined surfaces 126 act as an insert guide which are the first surfaces to engage the walls of the slot 140 during insertion of the leg portions 114, and thus aid in deforming the points 128.

Once the points 128 of the tabs 120 exit the opposite end of the slot 140, and are free of the slot walls, the resilient material of the tabs 120 causes the tabs 120 to spring back to their normal condition, as shown in FIG. 13. The thickness of the part 136, and therefore the depth of the slots 140, is predetermined so that the underneath wall surface of the part 136 around the slot 140 engages the upper inclined outer surfaces 124 of the tabs 120.

Thus, if a moderate force is used in an attempt to remove the extruded molding trim 110 from the part 136, the upper inclined outer surfaces 124 will contact the underneath wall surface of the part 136 around the slot 140 in a wedging engagement to prevent the removal of the extruded molding trim 110. However, if a sufficiently strong force is used, the points 128 of the tabs 120 will again be deformed, in an opposite direction, by the walls of the slots 140 so that the tabs 120 of the extruded molding trim 110 can be forced back into the slots 140 and removed from the part 136, such as when it is necessary to replace the extruded molding trim 110.

It is noted, that even though only one pair of tabs 120 is shown in FIGS. 13 and 14, it is understood that additional pairs of tabs 120 can be added to the leg portions 114 so that the extruded molding trim 110 can be attached to a variety of parts having different thicknesses, where one extruded molding trim 110 would fit all the parts.

Figure 15:
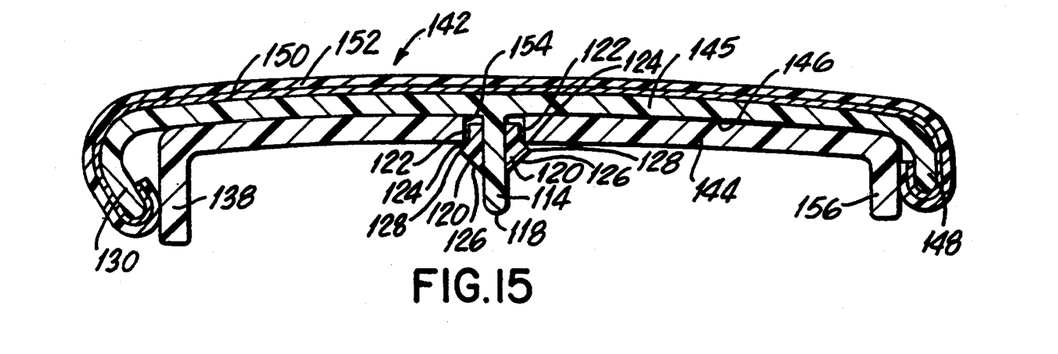
FIG. 15 is yet a further modified extruded molding trim attached to a molding.

FIG. 15 shows yet another modified extruded molding trim 142 which is similar to the above extruded molding trim 110, except the molding trim 142 has been made wider to cover both of the opposing longitudinally extending side edges of a plastic molding or part 144 of an automobile or appliance, such as a refrigerator, dishwashing machine and the like. Accordingly, the extruded molding trim 142 includes a modified longitudinally extending upper strip-like portion 145 and the longitudinally spaced apart leg portions 114 extending perpendicularly and vertically downwardly from an approximate center portion of the underneath surface 146 of the upper strip-like portion 145. The leg portions 114 are constructed in the same manner as mentioned above, having the curved or rounded free end 118, and one pair of pointed tabs 120 extending outwardly from opposite sides of each leg portion 114. Each pointed tab 120 also includes the upper vertical outer surface 122, the downwardly inclined outwardly extending outer surface 124, and the downwardly inclined inwardly extending outer surface 126, where the inclined outer surfaces 124, 126 form the outwardly transversely extending point 128.

Here again, one outer side edge of the upper strip-like portion 145 is curved downwardly to provide the curved side flange 130, with the opposite outer side edge of the upper strip-like portion 145 being bent downwardly to provide an opposing side flange 148. A metallic strip 150 is disposed around the side flange 130 and extends across the upper strip-like portion 145 to be disposed around the opposite side flange 148, the metallic strip 150 being fabricated and functioning in the same manner as the above-mentioned metallic strip 132 shown in FIG. 13.

Accordingly, once again a protective transparent plastic strip 152 is disposed over the metallic strip 150 to function in the same manner as the above-mentioned transparent plastic strip 134 of FIG. 13 so that a metal appearance is provided as described above. Here again, the upper strip-like portion 145 is preferably opaque and can be made in any desired color or texture. As indicated above, the metallic strip 150 and the protective transparent strip 152 can be extruded together with the upper strip-like portion 145 and the leg portions 114, or can be mounted onto the upper strip-like portion 145 after the extrusion thereof.

Preferably, as indicated above, the upper strip-like portion 145 and the leg portions 114 are fabricated from a rigid plastic material, such as the above-mentioned ABS, where the pointed tabs 120 are fabricated from a resiliant deformable plastic material, such as the above-mentioned urethane, in order to function in a proper manner as indicated above. Here again, the part 144 is preferably fabricated from a rigid plastic material, and includes slots 154 extending through the upper portion of the part 144, the slots 154 being longitudinally spaced apart by a predetermined distance and also being approximately centrally spaced between the longitudinally extending opposing side edges 138 and 156 of the part 144 to properly receive associated ones of the leg portions 114 therein.

In the assembly, the side flange 130 is lined up with the side edge 138, the side flange 148 is lined up with the side edge 156, and the pilot ends 118 of leg portions 114 are lined up with their associated slots 154, where the free end 118 of the legs 114 acts as a pilot to guide the leg portions 114 into the slots 154. The extruded molding trim 142 is then pushed towards the part 144 so that the side flanges 130, 148 engagingly slide against their associated side edges 138, 156 as the leg portions 114 are being inserted into their associated slots 154. Accordingly, during the insertion of the leg portions 114, the point 128 of each pointed tab 120 is deformed in the manner as mentioned above.

Once the points 128 of the pointed tabs 120 exit the opposite end of the slots 140, the pointed tabs 120 spring back to their normal condition, as shown in FIG. 15, for engagement with the part 144 in the same manner as mentioned above, where a further description thereof is not thought necessary. It is noted, as indicated above, that a sufficiently strong force can be used to deform the points 128 of the pointed tabs 120 to remove the extruded molding trim 142 from the part 144, such as when it is necessary to replace the extruded molding trim 142. It is further noted, that additional pairs of tabs 120 can be added to each of the leg portions 114, as indicated above, so that one extruded molding trim 142 would fit a variety of parts having different thicknesses.

It is noted, that each of the above embodiments discloses a one piece longitudinally extending upper strip-like portion having centrally located, longitudinally spaced apart leg portions extending perpendicularly downwardly from the upper strip-like portion, and aligned pairs of projecting tabs extending outwardly from opposite longitudinal sides of each leg portion. Accordingly, as set forth below, FIGS. 16 through 26 show modifications thereof, which could be made to each of the above-mentioned embodiments. However, by way of example, each of these additional modifications are shown with respect to the embodiment of FIG. 1, though it is understood that the same additional embodiments could be made to any one of the above-mentioned embodiments, where a showing thereof is not thought necessary.

Furthermore, each of the embodiments shown in FIGS. 16 through 26 has a one piece integral body member including a longitudinally extending upper strip-like portion 12 similar and functioning in substantially the same manner as the upper strip-like portion 12 shown in FIG. 1. Accordingly, each of the upper strip-like portions 12 in the embodiments of FIGS. 16 through 26 is extruded from a plastic material or materials as mentioned above and includes the undersurface 16 from which the leg portions extend downwardly, the metallic strip 22 therein where the above-mentioned plastic ribbon-like strip 24 has been omitted for clarity but may be added if desired, the longitudinally extending recess 25 to provide the enlarged longitudinal outer edges 26 and 28. The additional embodiments will now be discussed below.

Figures 16, 17, 18, 19:
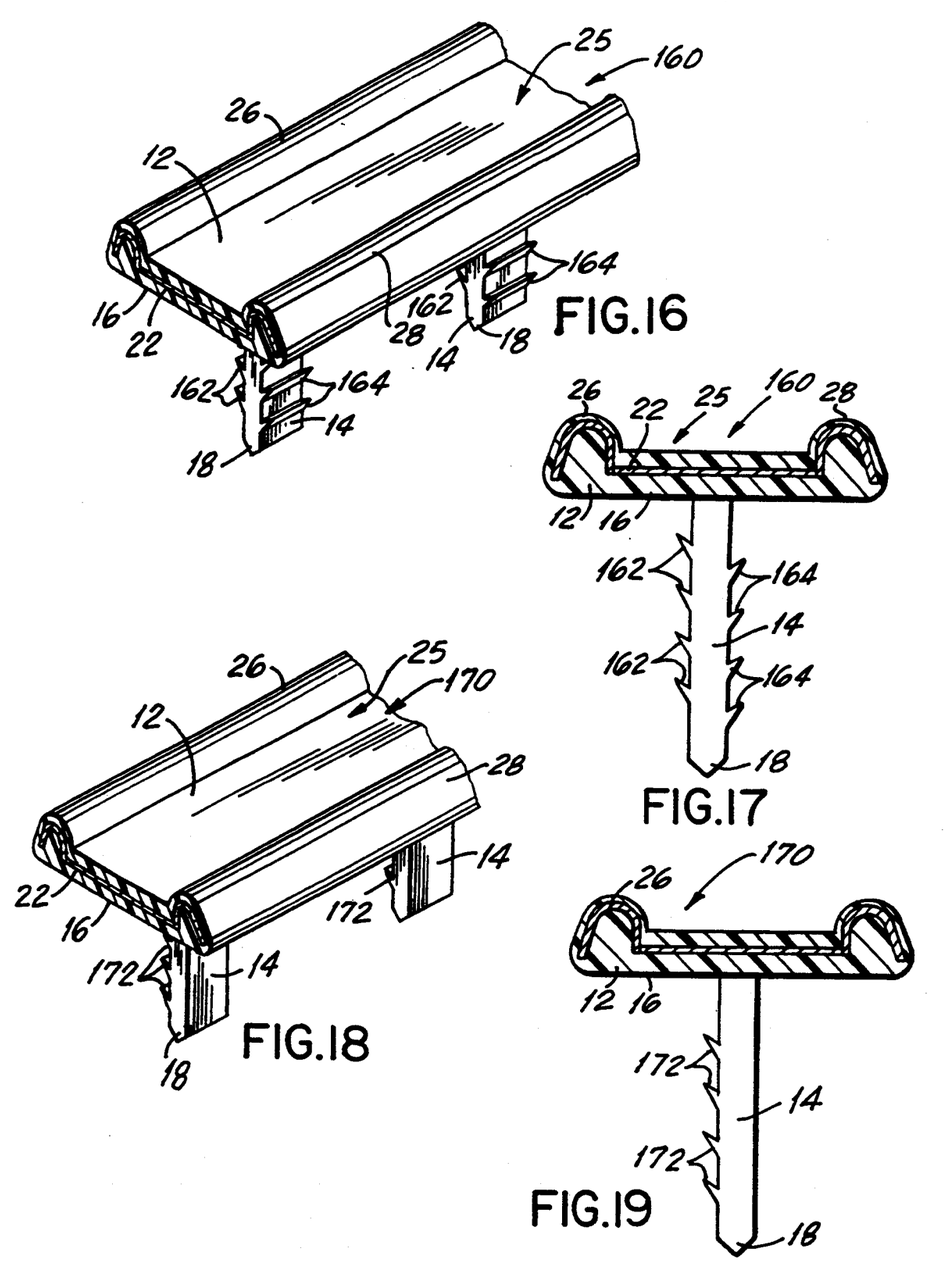
FIG. 16 is a fragmented perspective view of another modified extruded molding trim similar to the extruded molding trim of FIG. 1, showing the projecting tabs alternately extending outwardly from opposite sides of each leg portion in a staggered arrangement.
FIG. 17 is an end view, in cross-section, of the extruded molding trim of FIG. 16.
FIG. 18 is a fragmented perspective view of yet another modified extruded molding trim similar to the extruded molding trim of FIG. 1, showing the projecting tabs extending outwardly from only one side of each leg portion.
FIG. 19 is an end view, in cross section, of the extruded molding trim of FIG. 18.

As shown in FIG. 16 and 17, the centrally located, longitudinally spaced apart leg portions 14 of the modified extruded molding trim 160 extend perpendicularly and vertically downwardly from the underneath surface 16 of the upper strip-like portion 12, with each leg portion 14 having a pointed free end 18. However, unlike above, each leg portion 14 has numerous pointed projecting tabs 162 extending transversely outwardly in an upward direction from one longitudinal side of each leg portion 14, and additional pointed projecting tabs 164 alternately extending transversely outwardly in an upward direction from the opposite longitudinal side of each leg portion 14 in a staggered arrangement, as best shown in FIG. 17. As mentioned above, the tabs 162, 164 can be fabricated from a rigid or resilient deformable plastic material.

As shown in FIGS. 18 and 19, the longitudinally spaced apart leg portions 14 of the modified extruded molding trim 170 extends perpendicularly and vertically downwardly from the underneath surface 16 of the upper strip-like portion 12. However, unlike above, the numerous pointed projecting tabs 172 extend transversely outwardly in an upward direction from only one longitudinal side of each leg portion 14, as best shown in FIG. 19. Here again, the tabs 172 can be fabricated from a rigid or resilient deformable plastic material.

Figures 20, 21, 22, 23:
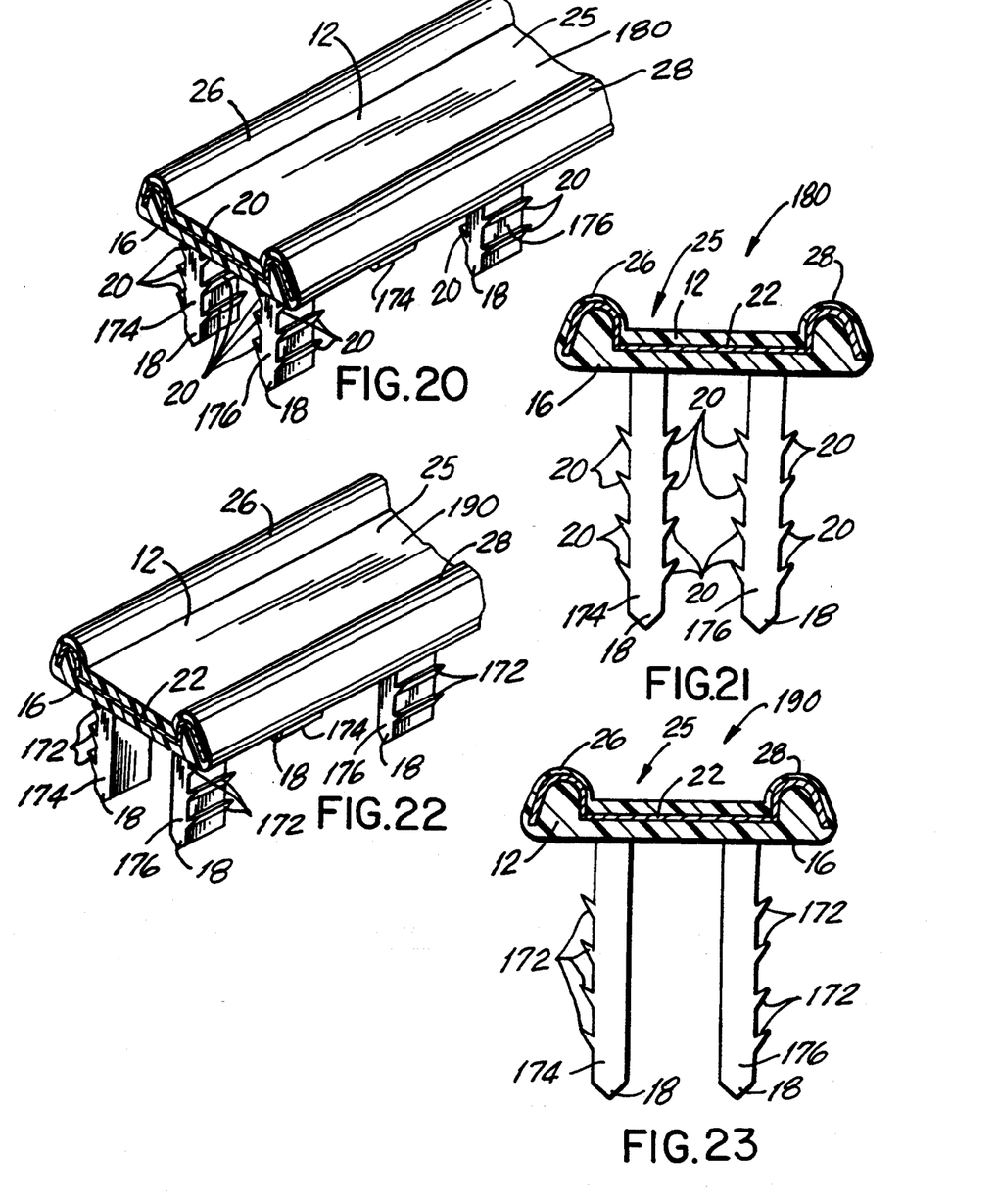
FIG. 20 is a fragmented perspective view of a further modified extruded molding trim similar to FIG. 1, showing spaced apart longitudinally extending pairs of aligned leg portions.
FIG. 21 is an end view, in cross section, of the extruded molding trim of FIG. 20.
FIG. 22 is a fragmented perspective view of still another modified extruded molding trim similar to the extruded molding trim of FIG. 20, showing the projecting tabs extending outwardly from only one outer side of each leg portion.
FIG. 23 is an end view, in cross section, of the extruded molding trim of FIG. 22.
Figures 24, 25:
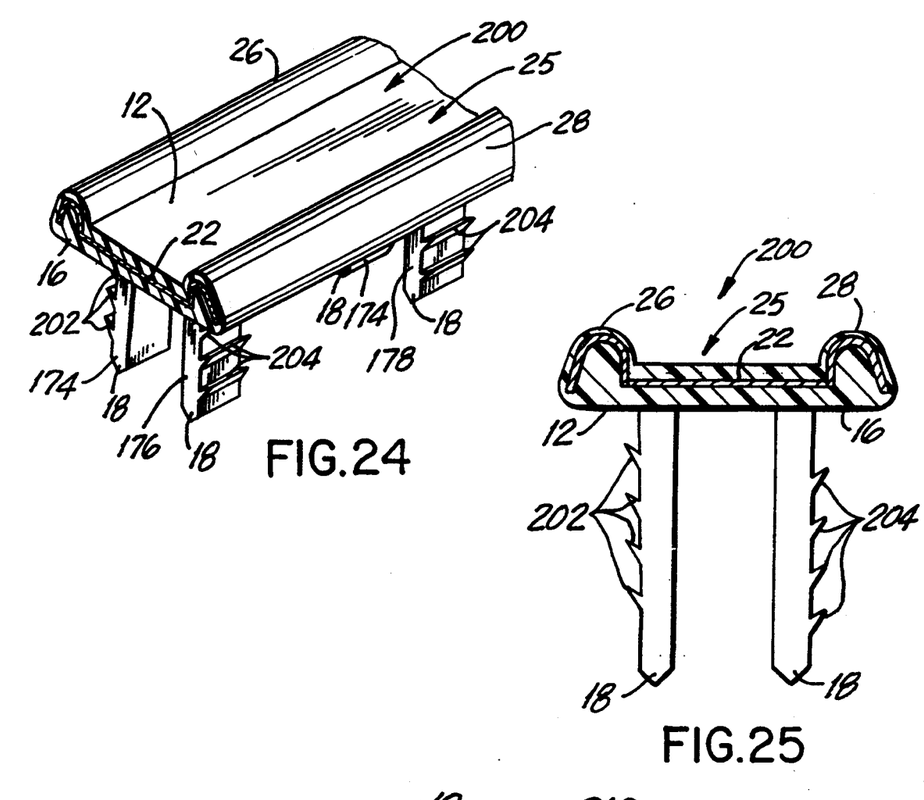
FIG. 24 is a fragmented perspective view of yet another modified extruded molding trim similar to the extruded molding trim of FIG. 22, showing the projecting tabs on one outer side of the leg portions in one longitudinal row alternating with the projecting tabs on the opposite outer one side of the leg portions in the other longitudinal row in a staggered arrangement.
FIG. 25 is an end view, in cross section, of the extruded molding trim of FIG. 24.

FIGS. 20 through 26 show further modified embodiments having two longitudinal rows of leg portions 174, 176 extending perpendicularly and vertically downwardly from the underneath surface 16 of the upper strip-like portion 12. The leg portions 174 in one longitudinal row are transversely spaced apart from the leg portions 176 in the other longitudinal row, either in an aligned or staggered arrangement. Obviously, the two longitudinal rows of transversely spaced apart leg portions 174, 176 shown in the drawings are formed from a pair of transverse second and third bar-like portions extending perpendicularly downwardly from the longitudinally extending underneath surface of a longitudinally extending first bar-like portion which forms the upper strip-like portion 12. Thus, the second and third bar-like portions are horizontally spaced apart from each other in the same manner as the leg portions 174, 176 are horizontally spaced apart from each other, as best shown in FIGS. 21, 23 and 25. Each of the leg portions 174, 176 has the above-mentioned pointed free end 18 thereon. The double row embodiments will now be discussed below.

FIGS. 20 and 21 show the modified extruded molding trim 180 having associated pairs of the leg portions 174, 176 of the two rows in transverse alignment with each other. Each of the leg portions 174, 176 is substantially the same as the leg portion 14 shown in FIGS. 1 and 2, so that each leg portion 174, 176 includes the numerous aligned pairs of pointed projecting tabs 20 extending transversely outwardly in an upward direction from opposite longitudinal sides of each leg portion 174, 176, as best shown in FIG. 21. As indicated above, the tabs 20 can be fabricated from a rigid or resilient deformable plastic material.

FIGS. 22 and 23 show a modified extruded molding trim 190 which is similar to the above molding trim 180, except the numerous pointed projecting tabs 172 extend transversely outwardly in an upward direction from only one longitudinal side of each leg portion 174, 176, in the same manner as the tabs 172 of the extruded molding trim 170. Preferably, the tabs 172 are disposed on the outer surfaces of the leg portions 174, 176 facing away from each other. Furthermore, as best shown in FIG. 23, the tabs 172 on the leg portion 174 in one row are in transverse alignment with associated tabs 172 on the associated leg portion 176 in the other row, where as mentioned above, associated pairs of the leg portions 174, 176 are in transverse alignment with each other. Once again, the tabs 172 can be fabricated from a rigid or resilient deformable plastic material.

FIGS. 24 and 25 show the modified extruded molding trim 200 which is substantially the same as the above-mentioned extruded molding trim 190, except for the positioning of the tabs 202, 204. As best shown in FIG. 25, the numerous pointed upwardly projecting tabs 202 on the leg portion 174 in one row are alternately spaced with respect to the numerous pointed upwardly projecting tabs 204 on the associated leg portion 176 in the other row in a staggered arrangement, similar to the staggered arrangement of the tabs 162, 164 of the extruded molding trim 160. Here again, pairs of the leg portions 174, 176 are in transverse alignment with each other. Furthermore, the tabs 202, 204 can be fabricated from a rigid or resilient deformable plastic material, as indicated above.

Figure 26:
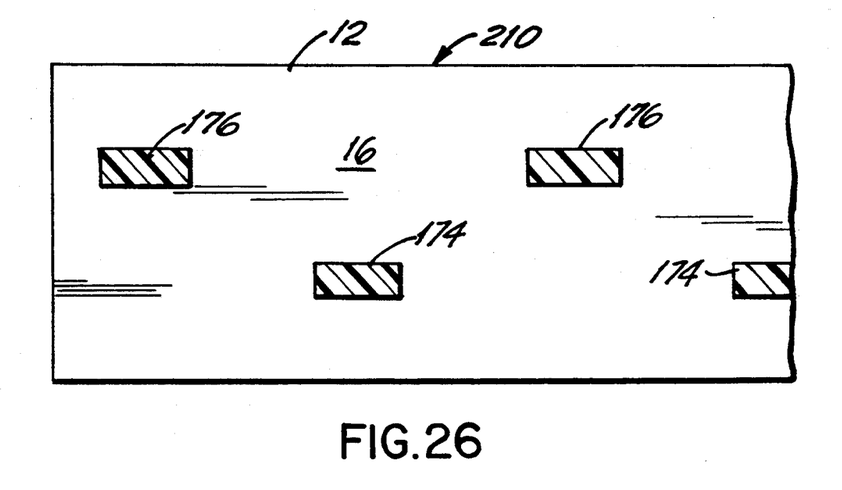
FIG. 26 is a fragmented bottom plan view of yet still another modified extruded molding trim, showing the leg portions in cross section where the bottom portions thereof have been removed, with the leg portions in one longitudinal row alternating with the leg portions in the other longitudinal row in a staggered arrangement.

FIG. 26 shows a modified extruded molding trim 210 from the underneath side thereof. The extruded molding trim 210 has the leg portions 174, 176 extending perpendicularly outwardly from the underneath surface 16 of the upper strip-like portion 12, where the end portions of the leg portions 174, 176 are not shown for clarity thereof in order to be applicable to any of the projecting tab arrangements shown in FIGS. 20 through 25. However, instead of pairs of the leg portions 174, 176 being transversely in alignment with each other, as mentioned above, the leg portions 174 in one row of the extruded molding trim 210 are alternately spaced with respect to the leg portions 176 in the other row of the extruded molding trim 210 to provide a spaced apart staggered arrangement therebetween. Accordingly, the leg portions 174, 176 of the extruded molding trim 210 can have any of the tab arrangements thereon which are shown in FIGS. 20 through 25.

Each leg portion on the above mentioned extruded molding trims of the present invention was inserted into its own associated slot or the hole provided in the molding so that there was a slot or hole for each leg portion. Accordingly, when the extruded molding trim has two rows of associated pairs of leg portions, with the leg portions of each pair being in a transverse alignment with each other, such as the above-mentioned extruded molding trim 190 shown in FIGS. 22 and 23, each associated aligned pair of the leg portions 174, 176 can be inserted into a single slot or hole. In this case, either the entire extruded molding trim or just the leg portions thereof are fabricated from a resilient flexible material to permit the aligned associated leg portions of each of the pairs to be squeezed together when being inserted through their respective slots or holes, whereby the associated aligned leg portions spring or spread apart back to a normal condition after the tabs thereon exit from the slots or holes. The resilient flexible material can be fabricated from various thermoplastic materials and blends of thermoplastic materials, such as ABS, urethane, rigid vinyl, flexible vinyl, high impact styrene and the like. In addition to the above-mentioned extruded molding trim 190, other types of extruded molding trims having two rows of associated aligned pairs of leg portions can also be inserted in the same above manner, as shown for example below in FIGS. 27-31.

Figure 27:
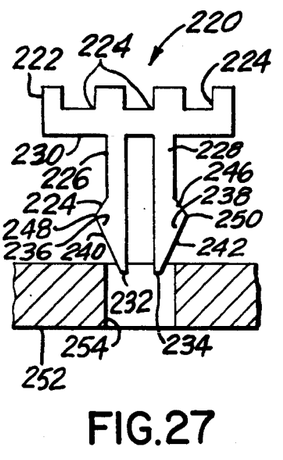
FIG. 27 is an end view of yet another modified extruded molding trim similar to the extruded molding trim of FIG. 20, showing the aligned leg portions thereof about to be inserted into a molding, shown in cross section and fragmented.
Figure 28:
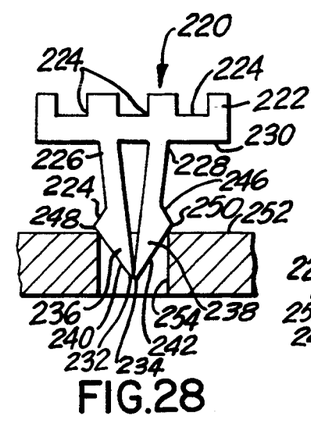
FIG. 28 is a fragmented end view, partially in cross section, similar to FIG. 27, showing the squeezed together aligned leg portions being inserted through an opening in the molding.
Figure 29:
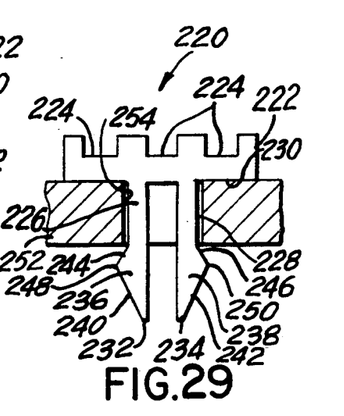
FIG. 29 is a fragmented end view, partly in cross section, similar to FIGS. 27 and 28, showing the extruded molding trim secured to the molding.

FIGS. 27-29 show a modified extruded molding trim 220 which functions in a similar manner to the above-mentioned extruded molding trim 190. The extruded molding trim 220 includes a longitudinally extending upper strip-like portion 222 provided with longitudinally extending grooves 224 in its upper surface to function as a non-skid upper surface in the same manner as the above-mentioned upper strip-like portion of the extruded molding trim 70 shown in FIGS. 9 and 10. Two longitudinal rows of leg portions 226, 228 extend perpendicularly and vertically downwardly from the underneath surface 230 of the upper strip-like portion 222. The leg portions 226 in one longitudinal row are transversely spaced apart from the leg portions 228 in the other longitudinal row. Associated pairs of the leg portions 226, 228 are in transverse alignment with each other, being formed from a pair of transverse bar-like portions in a like manner as the leg portions 174, 176 mentioned above. As indicated above, either the entire extruded molding trim 220 or just the leg portions 226, 228 thereof are fabricated from a resilient flexible plastic material, such as mentioned above, to permit the leg portions 226, 228 to be squeezed together, as mentioned below.

Each of the leg portions 226, 228 have a curved or rounded free end 232, 234, respectively, and one pointed tab 236, 238, respectively, extending outwardly from an outer side of each leg portion 226, 228, so that the tabs 236, 238 point outwardly away from each other. Each tab 236, 238 includes an outwardly inclined outer surface 240, 242 extending upwardly from the free end 232, 234, respectively. The inclined outer surface 240, 242 extends into an adjacent inwardly inclined, upwardly extending outer surface 244, 246, respectively, where the upper end of the inclined outer surface 244, 246 engages the leg portion 226, 228, respectively. Thus, the inclined outer surfaces 240, 244 and 242, 246 form an outwardly transversely extending point 248, 250, respectively.

As shown in FIGS. 27-29, the molding 252 or the part of the vehicle, appliance and the like has a thickness substantially equal to the distance between the underneath surface 230 of the upper strip-like portion 222 and the upper ends of the inclined outer surface 244, 246. The molding 252 can be fabricated from any suitable material, such as metal, wood, plastic and the like. A predetermined number of longitudinally spaced apart slots or holes 254, preferably equal in number to the number of pairs of aligned associated leg portions 226, 228 on the extruded molding trim 220, are provided through the molding 252. Each slot or hole 254 receives one pair of aligned associated leg portions 226, 228 therein, in the manner set forth below. As best shown in FIG. 29, the transverse width of each slot or hole 254 is slightly larger than the distance between the outer side surfaces of the aligned associated leg portions 226, 228, but the transverse hole width is less than the distance between the points 248, 250 on the aligned associated leg portions 226, 228, for the reasons set forth below.

As shown in FIG. 27, the extruded molding trim 220 is disposed above the molding 252 so that the free ends 232, 234 are aligned with an associated slot or hole 254, where the free ends 232, 234 function as a pilot to guide the aligned associated leg portions 226, 228 into the slot or hole 254. As shown in FIG. 28, the extruded molding trim 220 is pushed downwardly so that the inclined outer surfaces 240, 242 engage the walls of the slot or hole 254, and thus squeeze the aligned associated leg portions 226, 228 together to permit the entry thereof into the slot or hole 254. As shown in FIG. 29, once the tabs 236, 238 exit from the slot or hole 254, the aligned associated leg portions 226, 228 spring or spread apart back to the normal condition thereof due to the resilient flexible material thereof to capture the molding 252 between the underneath surface 230 of the upper strip-like portion 222 and the upper end of the inclined outer surfaces 244, 246, thus securing the extruded molding trim 220 to the molding 252.

Thus, if a moderate force is used in an attempt to remove the extruded molding trim 220 from the molding 252, the upper inclined outer surfaces 244, 246 will contact the underneath wall surface of the molding 252 around the slot or hole 254 in a wedging engagement to prevent the removal of the extruded molding trim 220. However, if a sufficiently strong force is used, the walls of the slot or hole 254 will engage the upper inclined outer surfaces 244, 246 to squeeze the aligned associated leg portions 226, 228 together so that the aligned associated leg portions 226, 228 can be removed from the slot or hole 254, such as when it is necessary to replace the extruded molding trim 220. It is further noted, that the length of the leg portions 226, 228 can be made in any predetermined length so that the tab-free portions thereof correspond to the thickness of the molding in order to engage same as indicated above.

Figure 30:
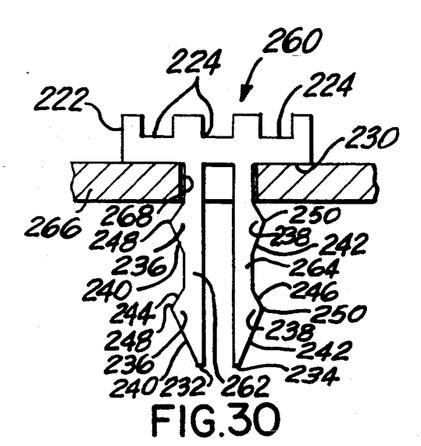
FIG. 30 is a fragmented end view, partly in cross section, showing a further modified extruded molding trim, similar to the extruded molding trim of FIG. 27, secured to the molding.
Figure 31:
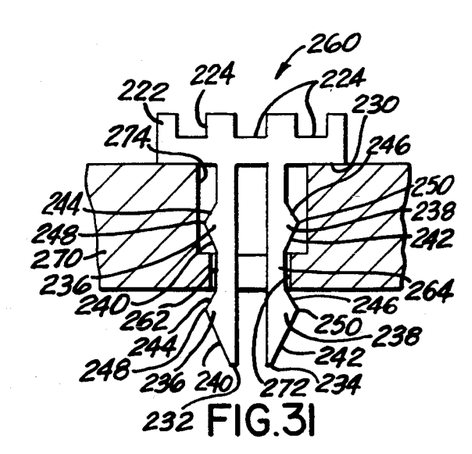
FIG. 31 is a fragmented end view, partly in cross section, showing the extruded molding trim of FIG. 30 secured to a thicker molding.

Accordingly, FIGS. 30, and 31 show a further modified extruded molding trim 260 which is similar to the above mentioned extruded molding trim 220, except the length of the aligned associated leg portions 262, 264 has been lengthened to provide for two pointed tabs 236, 238 on each leg portion 262, 264, respectively, where the tabs 236, 238 have the same construction and function as mentioned above. Accordingly, the additional tabs 236, 238 permit the same extruded molding trim 260 to be used for moldings or parts having different thicknesses, as set forth below.

As shown in FIG. 30, the extruded molding trim 260 is secured to a molding 266 or the part of the vehicle, appliance and the like. Due to the small thickness of the molding 266, only the upper tabs 236, 238 function to secure the extruded molding trim 260, in the manner set forth above, when the aligned associated leg portions 262, 264 are inserted through the slot or hole 268 in the molding 266. It is noted, that the distance between the upper tabs 236, 238 and the upper strip-like portion 222, and also the distance between the upper and lower tabs 236, 238, has been shortened with respect to the same distance on the above mentioned extruded molding trim 220 to accomodate the smaller thickness of the molding 266 relative to the above mentioned molding 252.

FIG. 31 shows a molding 270 having a larger thickness than either of the above mentioned moldings 252, 266. Accordingly, a smaller slot or hole 272 is made through the bottom of the molding 270 to coact with the lower tabs 236, 238, and a larger slot, hole or groove 274 is made through the upper surface of the molding 270 to accomodate the upper tabs 236, 238, where the upper larger slot, hole or groove 274 is in communication with the lower slot or hole 272. The depth of the lower smaller slot or hole 272 is substantially the same as the above mentioned slot or hole 268 in the molding 266, so that the walls of the lower smaller slot or hole 272 are captured between the upper and lower tabs 236, 238, in the manner indicated above, to secure the extruded molding trim 260 to the molding 270. The width of the upper larger slot, hole or groove 274 is less than the width of the upper strip-like portion 222, but is greater than the distance between the points 248, 250 of the tabs 236, 238, so that the upper tabs 236, 238 are free from engagement with the walls of the upper slot, hole or groove 274. Obviously, if desired, additional tabs 236, 238 can be provided on the leg portions 262, 264 in a like manner.

Numerous alterations of the structures herein discussed will suggest themselves to those skilled in the art. However, it is to be understood that the present disclosure relates to preferred embodiments of the invention which are for the purpose of illustration only, and are not to be construed as limitations of the invention.

What is claimed is:

1. A method of forming a molding trim for vehicles and appliances, comprising:

extruding a plastic strip with a uniform cross section throughout its length to form a longitudinally extending construction having a longitudinally extending first bar-like portion formed from a rigid plastic material, and a transverse longitudinally extending second bar-like portion extending perpendicularly downwardly from a longitudinally extending underneath surface of said first bar-like portion;

providing, during said extruding, a decorative appearance on a longitudinally extending upper surface of said first bar-like portion;

forming, during said extruding, at least one continuous longitudinal rib extending transversely outwardly from at least one longitudinal side of said second bar-like portion so that said rib is spaced a predetermined distance from a free end of said second bar-like portion and also from said first bar-like portion;

notching said second bar-like portion from said free end of said second bar-like portion to said underneath surface of said first bar-like portion, including through said rib, at longitudinally spaced apart predetermined intervals, to provide notched first portions therein while maintaining uniform cross section of said first bar-like portion throughout its length; and removing the notched first portions so that remaining second portions of said second bar-like portions provide longitudinally spaced apart leg portions extending perpendicularly and vertically downwardly from said longitudinally extending underneath surface of said first bar-like portion with each of said leg portions having at least one tab thereon formed from remaining portions of said rib;

whereby said first bar-like portion having said decorative appearance and said leg portions having at least one tab on each leg portion provide a one piece integral construction for said molding trim to facilitate attachment of said molding trim to vehicles and appliances.

2. A method according to claim 1, including forming second bar-like portion and said rib from a rigid plastic material.

3. A method according to claim 1, including forming second bar-like portion from a rigid plastic material, and forming said rib from a resilient deformable or flexible plastic material.

4. A method according to claim 1, including forming said rib as an elongated finger extending upwardly towards said first bar-like portion.

5. A method according to claim 1, including forming said rib with an outwardly inclined outer surface adjacent to an inwardly inclined outer surface to provide a point extending transversely outwardly from said one longitudinal side of said second bar-like portion.

6. A method according to claim 1, including forming said rib with a point extending upwardly towards said first bar-like portion.

7. A method according to claim 1, including forming numerous pairs of aligned ribs on said second bar-like portion.

8. A method according to claim 1, including forming numerous continuous longitudinal ribs extending transversely outwardly from opposing longitudinal sides of said second bar-like portion in a staggered arrangement between said ribs on one side and said ribs on the opposite side of said second bar-like portion.

9. A method according to claim 1, including forming, during said extruding, a transverse third bar-like portion extending perpendicularly downwardly from said longitudinally extending underneath surface of said first bar-like portion so that said third bar-like portion is horizontally spaced from and parallel to said second bar-like portion, forming at least a second rib on said third bar-like portion, notching said third bar-like portion, and removing the notched portions from said third bar-like portion.

10. A method according to claim 9, including forming numerous ribs on said second and third bar-like portions.

11. A method according to claim 10, including forming said numerous ribs on said second bar-like portion in alignment with said numerous ribs on said third bar-like portion.

12. A method according to claim 10, including forming said numerous ribs on said second bar-like portion in a staggered arrangement with respect to said numerous ribs on said third bar-like portion.

* * * * *